Oct. 26, 1965   J. B. FINDLAY ETAL   3,213,881
DIRECTIONAL CONTROL VALVE
Filed July 17, 1963   7 Sheets-Sheet 1

INVENTORS:
Jack B. Findlay
Tommy A. Middlesworth
By Walter G. Greavy
Atty.

Oct. 26, 1965  J. B. FINDLAY ETAL  3,213,881
DIRECTIONAL CONTROL VALVE
Filed July 17, 1963  7 Sheets-Sheet 3

INVENTORS:
Jack B. Findlay
Tommy A. Middlesworth
By Walter G. Greeno
Atty.

United States Patent Office 3,213,881
Patented Oct. 26, 1965

3,213,881
DIRECTIONAL CONTROL VALVE
Jack B. Findlay, Downers Grove, and Tommy A. Middlesworth, Hinsdale, Ill., assignors to International Harvester Company, Chicago, Ill., a corporation of New Jersey
Filed July 17, 1963, Ser. No. 295,731
14 Claims. (Cl. 137—596)

This invention relates to controls for hydraulic fluid devices, but more particularly it is directed to directional control valve means adaptable for use with the hydraulic motors incorporated in hydrostatic drive mechanisms for vehicles.

The principal object of the invention is to provide an improved directional control valve unit of the rotary-spool type wherein a pair of side-by-side spool valve elements are independently manually operable to control the direction and flow of fluid through respectively associated hydraulic work-producing devices.

Another object is to provide a dual-spooled rotary-type directional control valve assembly having interlocking series flow-through means therein whereby when the spools are conditioned for neutral operation full fluid flow from inlet to outlet thereof is effected thereby providing, in effect, open-center-type operation.

A further object is to provide a plural-spooled rotary-type directional control valve having means therein providing a substantially uniform port area open to the flow of fluid so as to insure acceptable flow velocities therethrough in all operating positions of the spools thereof.

A still further object is to provide hydraulic control means employing a plurality of rotary operating spool valve elements and wherein said means are fashioned so as to provide hydraulic balance of the spool elements thereby minimizing unbalanced radial forces or side loading thereof.

A more general object of the invention is to provide, in a plural-spooled rotary-type directional control valve mechanism for hydraulic apparatus, integrally contained means providing a single hydraulic braking or anti-cavitation device operative responsive to a drop in the inlet port pressure of said control valve for closing off and providing a temporary shutoff of the outlet port of said control valve against the flow of fluid from the associated hydraulic apparatus when such associated apparatus is being operated.

An important object is to provide, in a manually operated dual-spooled rotary-type hydraulic control valve mechanism, pressure sensing and reactive means operative to effect longitudinal axial movement of the spool elements thereof whereby fluid pressure is bypassed from the high to the low pressure area of one or more of the hydraulic devices operatively associated therewith, and wherein said sensing and reactive means is concomitantly effective for increasing the frictional resistance to rotation of said spools upon increase of pressure in one or more of the associated hydraulic devices thereby providing a load sensing feel in a manual operating control handle means therefor.

Another important object is to provide hydraulic control apparatus employing a plurality of rotary operating spool valve means therein for controlling direction of fluid flow therethrough and having integrally contained relief valve means operative responsive to excessive pressures in said control apparatus for dumping or venting fluid directly to a sump or reservoir source of fluid supply.

A more specific object is to provide hydraulic control valve means including a body slidably and rotatively accommodating a plurality of spool valve elements, and additionally providing means defining interconnectable fluid passages and a plurality of fluid flow ports, and wherein said spool elements are independently selectively operative to establish a variety of interconnecting combinations of fluid passages between the different ports thereof so as to independently control the direction of motion of one or more of a plurality of hydraulically actuated devices associated with said control means.

The foregoing and other objects and advantages are obtained by the present invention, various novel features of which will be apparent from the description herein and the accompanying drawings disclosing an embodiment of the invention, and will be more particularly pointed out in the appended claims.

Referring now to the drawings, it will be noted the proposed control valve means has been depicted in association with hydraulic motors such as are usually employed in a hydrostatic drive mechanism for a vehicle, although it will be appreciated such application is shown primarily for purposes of illustration since the invention is not limited to this specific hydraulic device or work-producing application.

Figure 5:
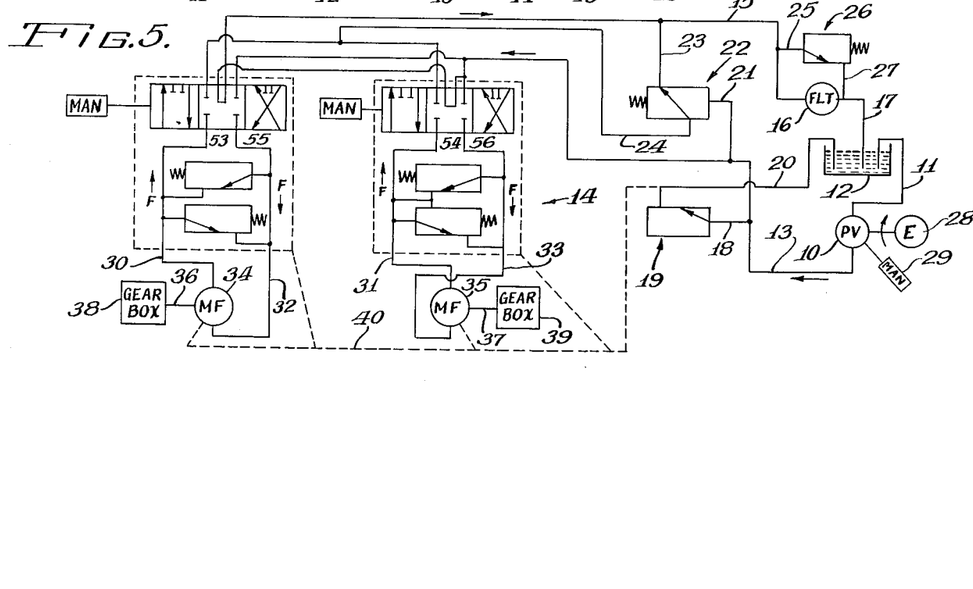
FIGURE 5 is a schematic representation of a hydraulic circuit employing the proposed control valve unit.
Figure 15:
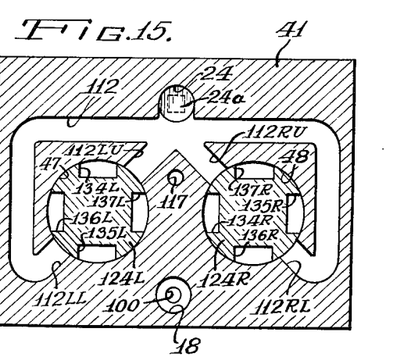

In FIGURE 5 there is illustrated a diagrammatic representation of a hydraulic circuit or system of the type adaptable for use with the present invention and, as illustrated, the system is conditioned for the neutral position of operation thereof. A variable displacement pump 10, which may be of conventional construction, has the inlet or suction side thereof connected by conduit 11 with a reservoir source of hydraulic fluid supply 12 and the outlet or pressure side of said pump is connected by a pressure conduit 13 to the inlet of a directional control valve assembly indicated in its entirety by the reference numeral 14, while the outlet or discharge side of said valve assembly is connected by a return conduit 15 to an upstream side of a conventional type filter unit 16, the opposite or downstream side of which filter communicates by conduit 17 with the sump or reservoir 12. A branch or fluid passage 18 communicating with inlet or pressure conduit 13 communicates the latter inlet with an inlet side of a relief valve, indicated generally by numeral 19, while the outlet or discharge of said relief valve communicates by way of conduit 20 with reservoir 12 or a suitable fluid sump. A branch or fluid passage 21 communicates the pressure or inlet conduit 13 with a pressure responsive area of a braking or anti-cavitation valve, indicated generally at 22, and a fluid passage 23 communicates an outlet area of said latter valve with return circuit conduit 15, while an inlet area of said braking valve device communicates with a longitudinally extending interconnecting fluid passage 24 which may have a closure plug 24a (FIGURE 15) blocking off an opposite end thereof. The return conduit 15 has has a branch 25 that connects with an upstream side of a conventional relief or filter bypass valve depicted generally at 26, while the downstream side of said latter valve is connected by a branch conduit 27 to conduit 17 which communicates with reservoir 12. Said filter bypass valve 26 operates to bypass return fluid around the filter element 16 when said filter, because of dirt accumulations or otherwise, is rendered ineffective or becomes inoperative.

The pump 10 may be driven by any suitable power means such as the engine indicated at 28, which, as is well understood, may be the power means motivating the vehicle in which the present invention is incorporated. Suitable manual controls, such as indicated diagrammatically at 29, may be provided for said pump but the details thereof are not pertinent to the present invention, hence no further elaboration thereof appears necessary.

The reverse flow output or work ports of control valve 14 as illustrated herein (FIGURE 5) are connected by conduits 30, 32 and 31, 33 to the respective propulsion motors 34, 35, although as previously mentioned they could be connected to other forms of work-producing hydraulically actuated devices. Said propulsion motors, which may be of any conventional type, are connected by drive transmitting shafts such as indicated at 36 and 37 to respective conventional gearbox assemblies 38 and 39 which, in turn, may be drivingly connected by suitable means (not shown) to the axle drive mechanism of the vehicle as is well understood. A suitable drainage passage or conduit, as depicted at 40, may be provided to drain any leakage from the motors or valve unit by way of conduit 20 back to reservoir 12 or a suitable fluid sump.

Now, in accordance with the more specific teachings of the invention, the proposed control valve assembly (FIGURE 1) includes a central body portion 41, an end cap 42 detachably secured as by the bolt means 43 to one end of said body, and an open-bottomed hood-like cover or bonnet 44 detachably secured as by the bolt means 45 to an opposite end of said body portion. End cap 42 has a threaded opening 46 therein to which the conduit 20, which drains to reservoir 12, may be suitably connected.

Figure 6:
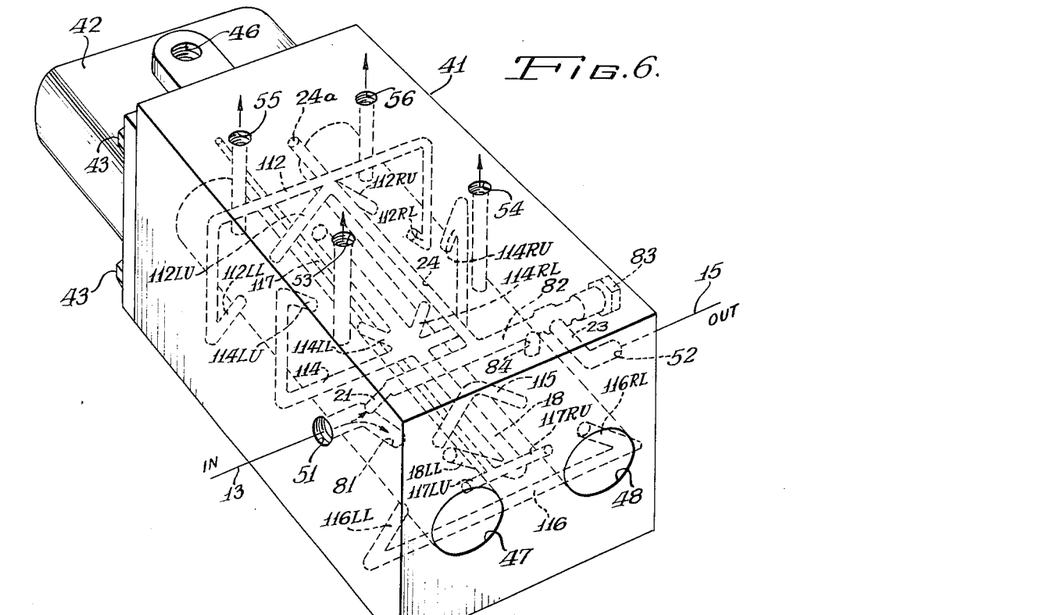
FIGURE 6 is a phantom-like diagrammatic perspective of the body or housing component of the proposed valve unit and shows primarily the various fluid flow passages provided therein.
Figure 7:
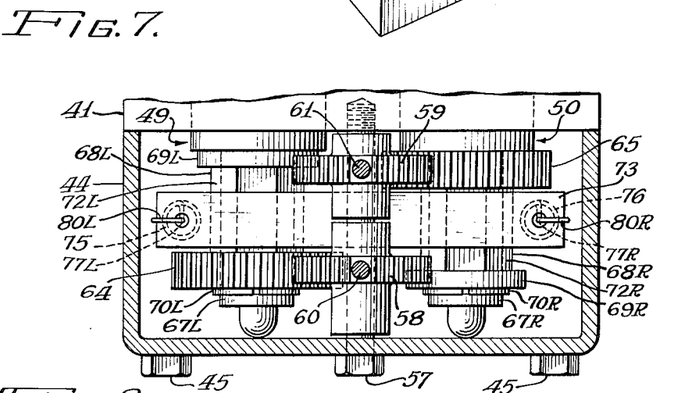
FIGURE 7 is a fragmentary plan section showing a form of manually operable controls for the proposed unit.

Valve body portion 41 (FIGURE 6) is fashioned with a pair of longitudinally extending side-by-side bores 47 and 48 therethrough that slidably and rotatably accommodate respective valve spool elements, indicated generally by reference numerals 49 and 50 (FIGURE 7). Although only one such valve spool element is fully illustrated in the drawings hereof it will be understood that the spools 49 and 50 are identical and hence, whenever shown, the identical parts or elements of the two spools will be suffixed with an L or an R to, respectively, indicate the designated part as a portion either of spool 49 which is leftwardly positioned, or 50 which is rightwardly positioned. Spool 50 upon positioning in bore 48 will be disposed 90° out of phase rotation with spool 49 since it will be rotated 90° counter-clockwise relative thereto for purposes which will later be apparent. An inlet or pressure port opening 51 (FIGURE 6) in one side face of said body is suitably fitted to connect pressure conduit 13 thereto and an outlet or discharge port 52 in an opposite face thereof is suitably fitted to connect return fluid conduit 15 thereto, while the reversible flow control or work ports 53, 54, 55 and 56 which may open through a top face of said valve body portion are suitably threaded to connect thereto the respective propulsion motor-connected conduits 30, 31, 32 and 33.

Figure 2:
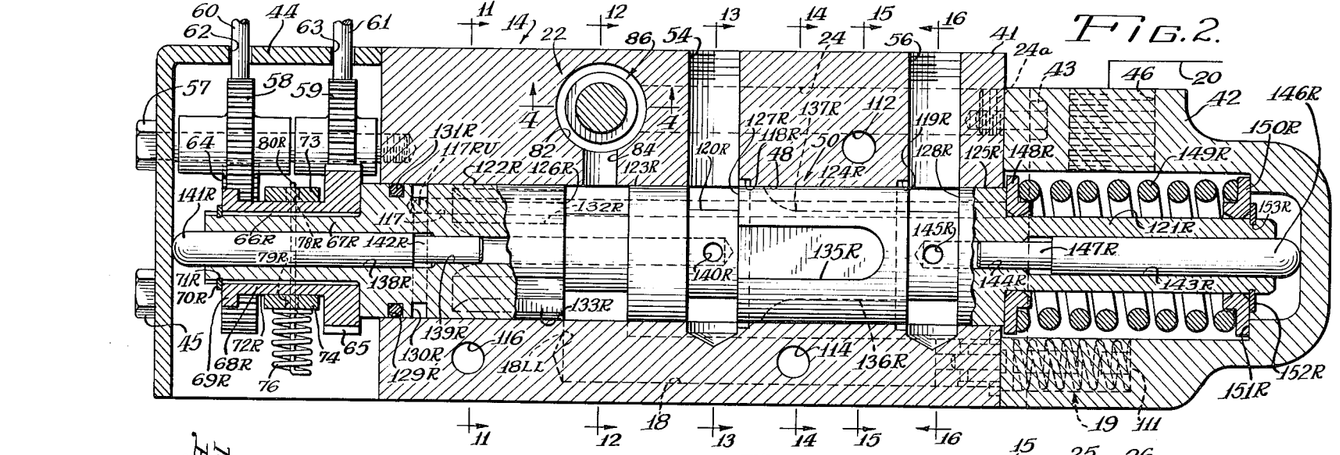
FIGURE 2 is a vertical elevational view, with portions thereof shown in section, taken generally along the line 2—2 of FIGURE 1.

A long-shanked bolt 57 (FIGURE 7) rotatably received through the end hood or bonnet 44 is threadably mounted in said valve body portion and the shank thereof is adapted to journally accommodate gear members 58 and 59 for operating the respective valve spool elements 49 and 50. Affixed to and projecting outwardly from said gear members are the respective operating control handles 60, 61 (FIGURE 2) whereby said valve spools are variously rotatably positioned within their respective bores. Peripherally extending slots 62, 63 in bonnet 44 may be provided to accommodate rotative movement of the respective handles 60, 61. Gear member 58 meshingly engages a gear 64 and gear member 59 engages a gear 65, and gear 65, in turn, is suitably secured, as by the splining indicated at 66R (FIGURE 2), onto the associated reduced-diametered end section or extension portion 67R, of spool 50, while gear 64 is similarly mounted (and only fragmentarily shown) on spool 49 (FIGURES 2 and 7). It will be appreciated now that clockwise rotation of either control handle produces counterclockwise rotation of the respective spool element, and vice versa.

An axially extending tubular quill-like portion 68R on gear 65 (FIGURE 7) terminates at the outer end of the quill in a flange 69R and a snap ring 70R, disposed in an annular groove 71R in the reduced section extension 67R and abutting said flange, cooperates with an end face of spool 50 to prevent axial movement of the gear member 65 independent of the respective said spool. It will be noted that while gear 64 is identically constructed it is positioned on its respective spool reversed fore and aft from that of gear 65, hence the respective snap-ring engages the radial face of the proximate gear member while urging the flange portion thereof into engagement with the end face of the associated spool. The outer peripheral surfaces of quill extension portions 68R, 68L, preferably, are octagonally fashioned (FIGURE 1) for a purpose that will presently be apparent. Gear 64 is similarly fashioned to that of gear 65 and like parts, where shown, are referenced with the same reference characters using the suffix L in lieu of R. A detent-like biasing means cooperative with octagonal surfaces 72R, 72L of said quill-like extension portions includes a pair of transversely disposed flat bar-like detent or braking members 73, 74 that are positioned between the flanges 69R, 69L and the respective gears 64, 65 and are vertically spaced so as to engage diametrically opposite faces of the octagonal surfaces of both said quill extension portions, while springs 75, 76 positioned to compressibly urge said detent bars toward one another function incident thereto to tightly engage said bars against said octagonal surfaces. A bent-over and extended end portion 77R of the spring 76 which is seated against the lower bar 74 is passed through aligned openings 78R, 79R in said bar members with the terminus of said end portion hooked over, as shown at 80R, so as to hookingly engage the outer surface of the upwardly disposed bar 73. Spring 75, of course, is similarly arranged on the opposite end of said bar members.

In the body portion 41 (FIGURE 6) of said valve assembly the work ports 54 and 56 which function as a set open into bore 48 while work ports 53 and 55 which function as another set open into bore 47. Inlet port 51 connects into a diagonal passage 81 which opens into bore 47, while said port 51 also connects by way of passage 21 with the transverse bore 82 of braking valve 22 and the opposite or outer end of which latter bore is closed by a threaded closure plug 83. Bore 82 also communicates with bore 48 by way of a short vertical passage 84 which opens into both these bores. An intermediate portion of bore 82 is enlarged to provide a counterbore area 85 (FIGURE 4) proximate the entry area of connection passage 23 therewith. Positioned for slidable operation within the bore 82 is a spool valve element, indicated generally at 86, which includes axially spaced lands 87, 88 and 89 with intermediate grooves 90, 91 therebetween, oppositely extending guide plunger sections 92, 93, and a coil spring 94 compressibly disposed around a reduced-diameter section 95 of plunger 93 and seated between an end face of plunger 93 and closure plug 83. Plunger 92 is slidably journaled in passage 21 while plunger 93 is slidably journaled in an insert 96 disposed in an outer enlarged end portion of bore 82. Ordinarily with valve spools 49 and 50 in any rotatively operative position other than neutral the normal inlet fluid pressure in port opening 51, acting against the exposed end face of guide plunger extension 92, of spool 86, causes said latter spool to slide in bore 82 against the opposition of spring 94 thereby permitting free fluid communication between the interconnecting conduit 24 and passage 23 the latter of which, in turn, opens into outlet port opening 52. However, in event of a decrease in said inlet pressure below a predetermined value, spring 94 will react to slide spool 86 in the opposite direction thereby interrupting the free fluid communication between passages 24 and 23 and closing off outlet port 52, against the flow of fluid from either of the propulsion motors 34, 35 until the inlet pressure returns to normal, so as to prevent cavitation of pump 10.

The relief valve 19 (FIGURES 2 and 3) is mounted in one end of longitudinal passage 18 which as formed provides a bore therefor. A cylinder-like insert 97 positioned in close-fit relationship in a bore end of passage 18 has an annular groove 98 therein that receives a sealing ring 99 whereby fluid leakage along said bore and past said insert is minimized. Said insert as fashioned has a central bore 100 therethrough that interconnects by way of radial passages 101, 101a with longitudinally extending slot-like recesses or passageways 102, 102a which open into the interior of end cap 42, and a flanged member 103 on the end of said insert is received in a recess 104 in the end face of body portion 41. A piston-like plunger 105 slidably positioned in bore 100 has a collar 106 fixedly secured thereto which is slidably accommodated in a recess 107 in a bonnet-like larger collar 108 which, in turn, is fixedly secured to one end of a spring guide plunger 105a. A coil spring 109 has one end thereof positioned over the outwardly extending end of guide plunger 105a and in abutting relation with the large collar 108, while the opposite end of said spring being positioned over a guide pin 110 mounted in an abutment ledge 111 of end cap 42 is seated in abutting relation with said ledge. Normally, spring 109 urges collar 108 into a tightly seated relation against the end face of flanged member 103 whereby said relief valve is maintained closed. However, in event of an increase above a predetermined maximum of the fluid pressure in passage 18 said pressure acting upon the end face of piston-plunger 105 causes said plunger to slide against the opposition of spring 109 carrying with it collar member 108 and thus opens radial passages 101, 101a and longitudinal passages 102, 102a to the free flow of fluid into the interior of end cap 42. Since said end cap is connected by conduit 20 (FIGURES 2 and 5) with reservoir 12 any fluid flowing thereinto from passage 18 will continue to be drained back to the connected reservoir until the pressure decreases sufficiently to permit automatic closure of said valve by spring 109.

Interconnecting passage 24 (FIGURE 6) at a point longitudinally spaced from its juncture with transverse bore 82 connects with an upwardly disposed transverse passage 112 which has a diagonal branch 112LU that opens into an upper portion of bore 47 and a lower diagonal branch 112LL that opens into a diametrically opposite lower portion of bore 47, and a diagonal branch 112RU opening into an upper portion of bore 48 and a lower diagonal branch 112RL that opens into a diametrically opposite lower portion of bore 48.

The longitudinally extending interconnecting passage 18 (FIGURE 6) in the lower portion of body 41 has at one end thereof an upwardly extending diagonal branch 18LL that opens into a lower portion of bore 47, and spaced longitudinally from said one end thereof said interconnecting passage 18 connects into a transversely disposed passage 114 which has an upper diagonal branch 114LU that opens into an upper portion of bore 47 and another upper diagonal branch 114RU that opens into an upper portion of bore 48, and a lower diagonal branch 114LL that opens into a diametrically opposite lower portion of bore 47 and a lower diagonal branch 114RL that opens into a diametrically opposite lower portion of bore 48.

An inverted generally V-shaped transverse passage 115 (FIGURE 6) opens at its opposite ends into an upper portion of each of bores 47 and 48, while a transversely extending passage 116 generally in the same vertical plane as passage 115 but disposed in a lower portion of body 41 has a diagonal branch 116LL that opens into a lower portion of bore 47 and a diagonal branch 116RL that opens into a lower portion of bore 48 both of which latter diagonal branches are diametrically opposite corresponding ends of passage 115.

A generally T-shaped drainage passage 117 (FIGURE 6) has a transverse branch 117LU that opens into an upper portion of bore 47 and a transverse branch 117RU that opens into an upper portion of bore 48. The opposite end of passage 117 extends through the end wall of body 41 and opens into end cap 42 which, as previously mentioned, communicates with reservoir 12.

Figure 16:
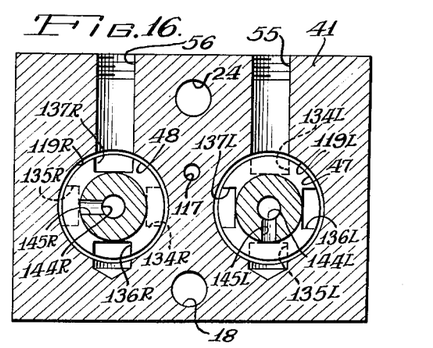

Adjacent the opening of work port 54 into bore 48 there is provided in bore 48 an annular recess 118R (FIGURE 2) which opens into port 54 as well as into bore 48, and adjacent work port 56 there is provided another annular recess 119R which opens into port 56 as well as into bore 48. Bore 47, of course, is also provided with similar slots designated 118L and 119L (FIGURES 3 and 16) and disposed proximate the openings of work ports 53 and 55 into the latter bore.

Figure 8:
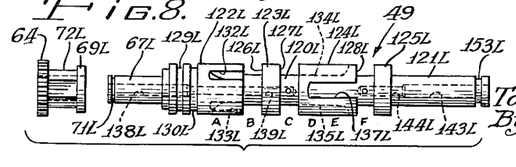
FIGURE 8 is an elevational view, shown in reduced scale, of one of the rotary valve elements.
Figure 14:
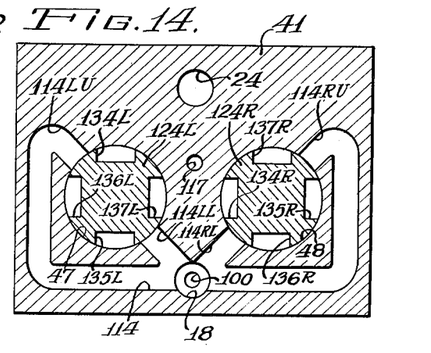

Since the spools 49 and 50 are identical in construction although disposed in the respective bores in a rotatively oriented position relative to one another (FIGURES 11–16), only one such spool need be described in complete detail. Spool 50 which is the rightwardly disposed spool will have the parts thereof referenced with an R suffix while the comparable parts or components of spool 49 (FIGURE 8), whenever shown, will be referenced with an L suffix. Spool 50 (FIGURES 1 and 2) is fashioned from an elongated body member 120R with a reduced-section extension 67R on one end and a reduced diametered extension 121R on the opposite end thereof. Between said end sections are lands 122R, 123R, 124R and 125R and disposed intermediate said lands are the respective grooves 126R, 127R and 128R, while land 122R is provided at one end thereof with the smaller annular grooves 129R and 130R. Groove 129R has positioned therein a suitable fluid-sealing ring member such as indicated at 131R for the purpose of restricting fluid leakage into the area of bonnet 44, and groove 130R opens into drainage passage 117RU while groove 130L opens into passage 117LU. Land 122R has fashioned on the outer surface thereof longitudinally extending slot-like recesses 132R, 133R which open into bore 48 and at an open end thereof into groove 126R the opposite end of said slots being dead-ended. These slots are diametrically spaced from one another and circumferentially spaced at an angle approximately 45° off the vertical. Land 124R has fashioned in the outer surface thereof two pair of similar longitudinally extending slot-like recesses. One pair of said slot-like recesses designated 134R, 135R (FIGURE 14) are positioned in a horizontally aligned plane and disposed so that the open end of each thereof opens into groove 127R, while a second pair of such slots designated 136R, 137R are positioned in a vertical plane approximately 90° from the other pair of slots in that land and have the open end thereof opening into groove 128R.

Extending axially inwardly from one end face of spool body 120R (FIGURE 2) is a bore 138R and extending from the inner end of said bore is a smaller diametered bore 139R and the inner end of said latter bore communicates with a radial passage 140R that opens into groove 127R. Bore 138R has slidably positioned therewithin a plunger 141R having a piston rod 142R extending axially inwardly from the inner end thereof and slidably disposed in the smaller bore 139R. The outer end of plunger 141R may, if desired, be rounded off as illustrated since this portion is adapted for engaging the inner wall of bonnet 44 as will be subsequently explained. Similar bores 143R, 144R and radial passage 145R opening into groove 128R are provided in the opposite end of spool body 120R for accommodation of a plunger 146R and piston rod 147R and the outer end of said latter plunger may be rounded off as indicated for abutting engagement with the inner wall of end cap 42. These axial plunger devices may also be termed servo-motor means since they are pressure sensing and reaction means that operate responsive to a pressure differential under certain conditions to effect a longitudinal or axial shifting of the respective valve spools as will be subsequently further explained.

The reduced-diametered end section or extension 121R (FIGURE 2), of spool body 120R, has a spring-seat collar 148R positioned thereon which is disposed to abut the end face of spool body 120R and to seatingly receive one end of a coil spring 149R. A similar seat collar 150R on the outer end of said extension normally abuts a snap-ring 152R mounted in an annular groove 153R in extension 121R proximate the outer end thereof, and said latter collar seatingly accommodates the opposite end of spring 149R which is positioned against collars 148R, 150R in a pre-loaded condition therebetween. As arranged, this spring is a two-way acting device, and it will be apparent, from the operation of the axial plungers 141R and 146R, that it also serves to aid in normally centering an associated valve spool element in its respective bore.

It will be noted that the axial or longitudinal distance from the face of ledge portion 151R, of end cap 42, to the end face of valve body portion 41 is slightly greater than the distance between the outer faces of the collars 148R and 150R. This spacing permits a small amount of slidable axial or longitudinal movement or float of the respective valve spool before said collars abuttingly engage the respective end faces of body portion 41 or ledge portion 151R thereby permitting when in float easy rotation of the spool from one rotatively operative position to another. However, when fluid pressure against pistons 141R or 146R increases, because of load on the vehicle or the like, sufficiently to cause movement of spool 50 and thereby cause either the collar 148R to engage the end face of body portion 41 or collar 150R to engage the end face of ledge portion 151R the friction between the engaging surfaces is proportionally increased as is the resistance to rotation of the spool. If such axial movement is sufficient to cause compression of the spring 149R the friction and resistance to turning will, of course, be further increased. This increase in friction, in turn, is reflected in the control handle, so that in the event any effort is made to rotatively operate the respective valve spool during this period of increased pressure, this increased friction has the effect of providing a load sensing "feel" to the manual control handle. Such "feel" may operate to provide the necessary intelligence to the operator to warrant a delay in operating the valve at that time.

Figure 17:
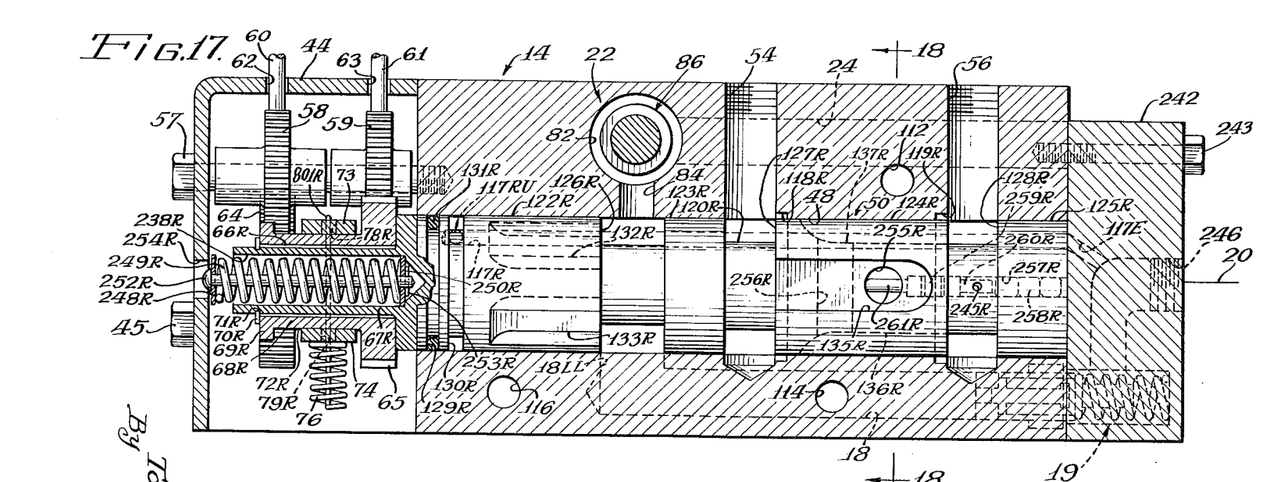
FIGURE 17 is a view generally similar to FIGURE 2 but showing a modification of valve spool element.

In FIGURE 17 there is illustrated a modified form of the valve spool element of the proposed control valve unit. The modification therein is directed to the means employed for axially shifting the valve spool responsive to increased pressures in the associated work-producing hydraulic devices and does not call for any changes in the flow directing and control features of the valve unit. In the modified structure parts and elements identical to those of the preferred form shown in FIGURE 2 have been referenced with the same reference numerals, while the comparable parts or components which are not identical will be referenced generally with similar reference numerals whenever feasible in the 200 series of numerals.

In the modified form, valve body 41 is fashioned with bores 47, 48, work ports 53, 54, 55, 56 arranged in two sets, inlet port 51 and outlet port 52, while the spool valve elements 49, 50 which are fashioned with lands 122, 123, 124 and 125 and grooves 126, 127 and 128 also contain slots 132, 133, 134, 135, 136 and 137 and are manually manipulated by control handles 60, 61 through gears 58, 59 and 64, 65 and biased to position by detent bars 73, 74. The reduced-section extension 67R of spool element 50 has an axially extending recess 238R therein that is closed at its inner end and is dimensioned to slidably accommodate a spring 249R positioned between the collar-like washers 248R, 250R retained thereagainst by the large headed stud 252R and a pin 253R. An aperture 254R in the wall of end bonnet 44 may be provided to accommodate the head of said stud.

The end closure cap 242 is secured in position by suitable bolt means such as indicated at 243 and is fashioned with an outlet port 246 that opens into the relief valve 19 and is adapted for connection by way of conduit 20 to reservoir 12. An additional passage 117E serves to interconnect the outlet end of drain passage 117 into the outlet port 246.

In modified spool valve element 50 a radially extending passage 255R communicatively interconnects the longitudinal slots 134R and 135R, while a similar passage 256R interconnects slots 136R and 137R. An axial bore 257R extends inwardly from the end of spool 50 to the radial passage 255R and communicates by way of radial passage 245R with annular groove 128R. Disposed within the bore 257R is a two-part plunger assembly, one part 258R of which is positioned proximate the end of bore 257R and a second part 259R is fashioned with reduced section portions 260R, 261R on opposite ends thereof the latter of which extends into radial passage 255R. Spool valve element 49 is similarly fashioned and corresponding parts thereof are referenced with the same numeral but with an L instead of an R suffix.

*Operation*

Figures 1, 3, 4:
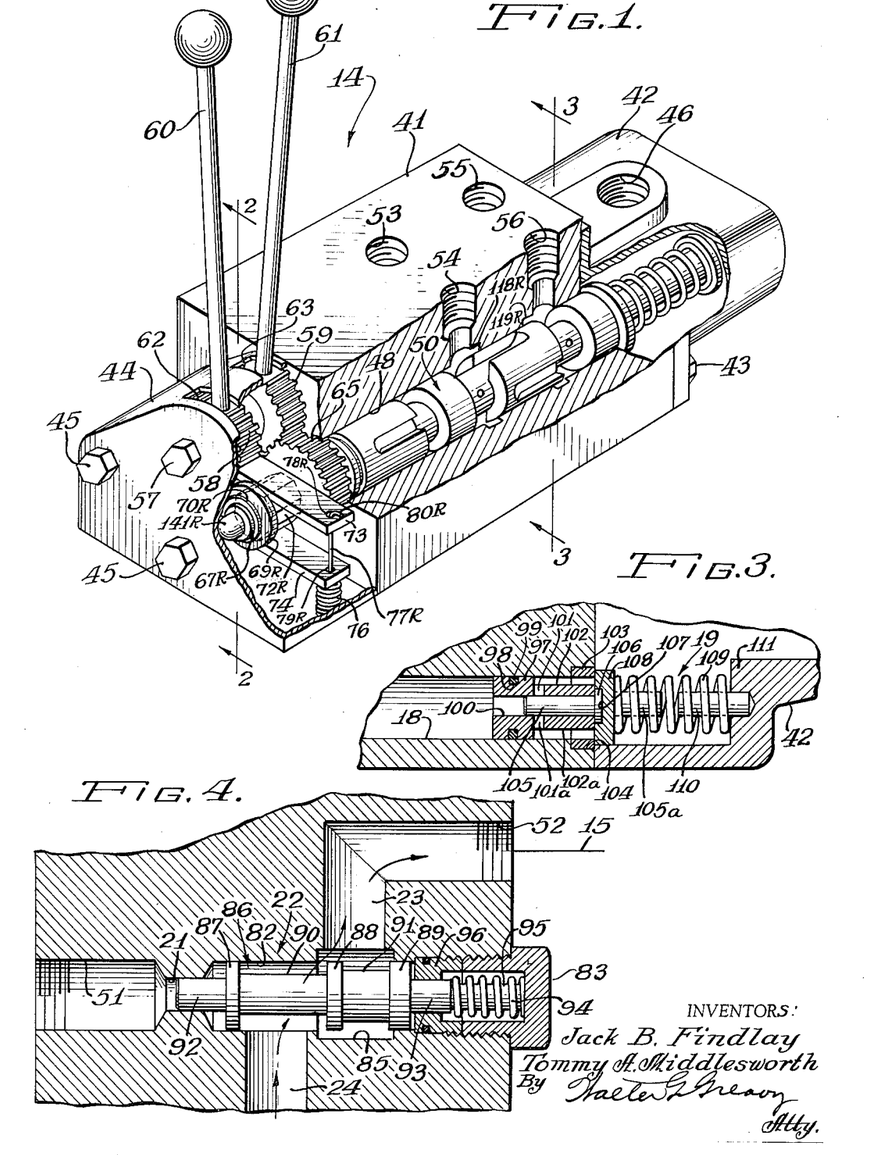
FIGURE 1 is a perspective view, with portions thereof cut away to better illustrate certain components thereof, showing the control valve unit of the present invention.
FIGURE 3 is a fragmentary vertical section view taken generally along the line 3—3 of FIGURE 1 and showing the internally contained relief valve components thereof as also indicated in broken lines in FIGURE 2.
FIGURE 4 is a fragmentary horizontal sectional view taken generally along the line 4—4 of FIGURE 2 and showing the braking of anti-cavitation valve components of the proposed unit.
Figures 9, 10, 10A:
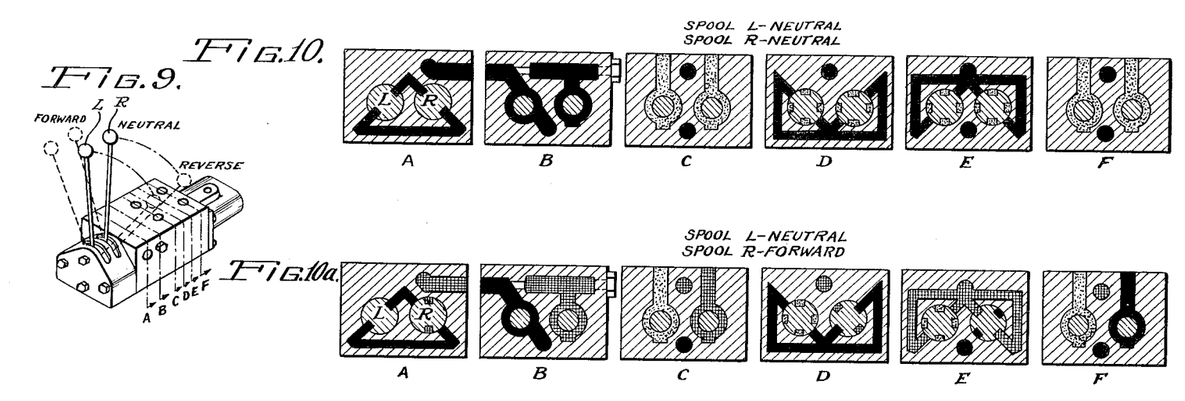
FIGURE 9 is a small scale perspective of the proposed control unit.
FIGURES 10 and 10a–10h, inclusive, are pictorial sectional views showing fluid pressure conditions in various passages at the sections indicated by the corresponding letters A–F on FIGURE 9.

Assume first a neutral position for both valve spools 49 and 50 in which case the control handles will be in an upright position as shown in FIGURES 1 and 9. In this event fluid under pressure flows from inlet port 51 through passage 81 into groove 126L, then through slots 132L and 133L in spool 49 to transverse passages 115 and 116, from whence it flows through slots 132R and 133R in spool 50 to groove 126R and thereafter through passage 84 into bore 85 of braking valve 22 and out through passage 23 to the outlet port 52, thereby providing interlocking series flow in neutral (see FIGURES 2, 6, 9–11).

Figure 10B:
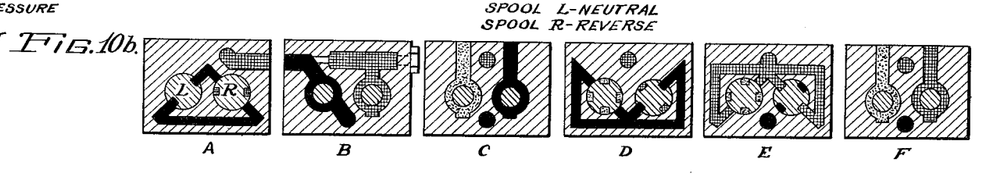
Figure 10C:
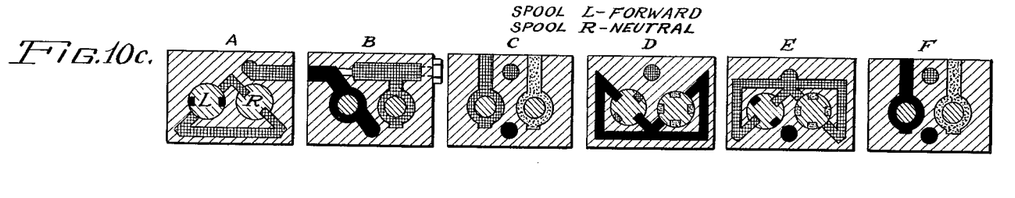
Figure 10D:
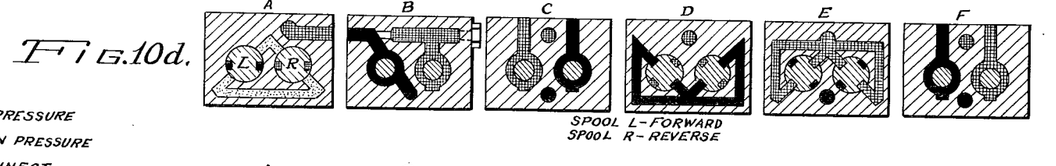
Figure 10E:
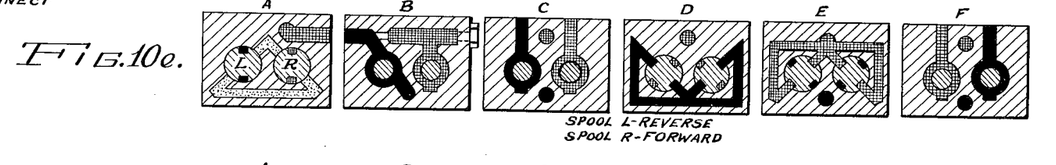
Figure 10F:
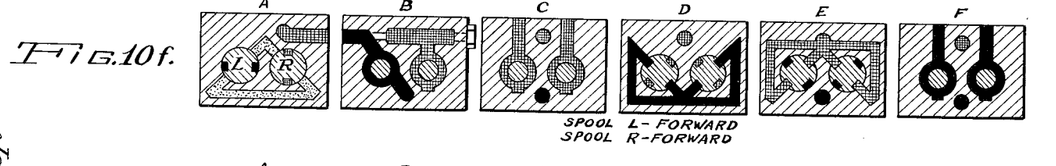

Next assume forward drive operation for the associated vehicle whereupon the handles 60 and 61 are rotated counterclockwise (as viewed in FIGURES 1 and 9) while the spools 49 and 50 are rotated clockwise approximately 45° to fully open the ports therein. In this case the fluid flow will be as pictorially represented in FIGURE 10f with fluid under pressure at inlet port 51 flowing through connected passage 81, and groove 126L into passage 18LL and 18 and thence into transverse passage 114 whose branches 114LU, 114LL and 114RL are in position to communicate with slots 136L, 137L and 137R, 136R of respective spools 49 and 50. Said slots open into grooves 128L and 128R which communicate with work ports 55 and 56 and, in turn, by way of conduits 32 and 33 with hydraulic motors 34 and 35. Under this condition the discharge or outlet side of these motors communicate by conduits 30 and 31 with work ports 53 and 54 which in their present position communicate by way of grooves 127L, 127R and slots 134L, 135L and 134R, 135R (FIGURE 10a(E)) with the respective diagonal branches 112LU, 112LL and 112RU, 112RL, of transverse passage 112, which latter passage in turn opens into the longitudinal interconnecting passage 24. At the same time the fluid pressure at inlet port 51 (FIGURE 4) acting on the end face of guide plunger 92 opens braking valve 22 to establish fluid communication therethrough from the interconnecting longitudinal passage 24 to the outlet passage 23 which discharges through outlet port 52 to reservoir 12.

Figure 10G:
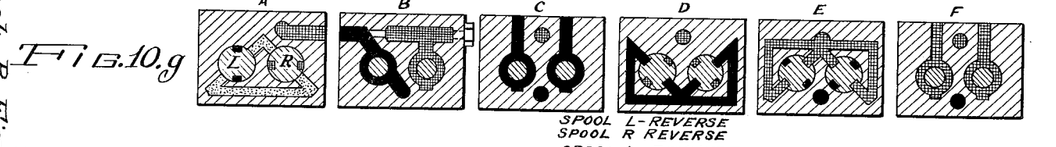
Figure 10H:
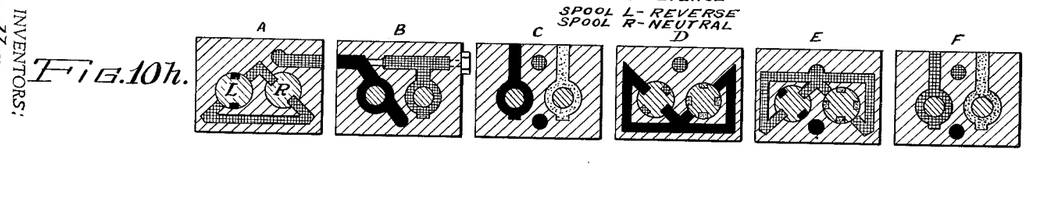
Figure 11:
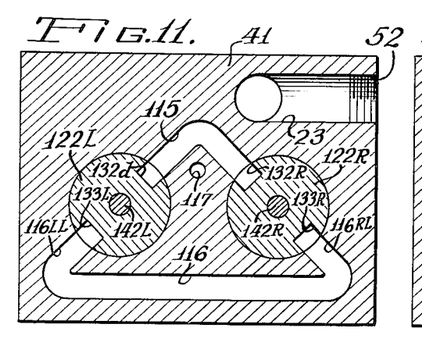
FIGURES 11–16, inclusive, are vertical sectional views, shown in somewhat reduced scale, taken generally along the correspondingly indicated lines of FIGURE 2.
Figure 12:
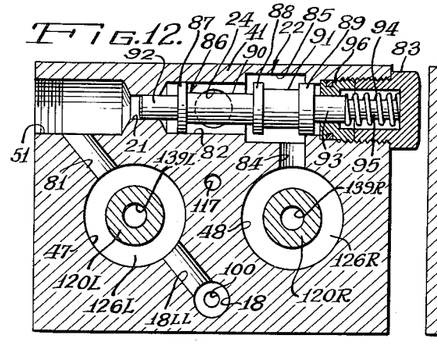
Figure 13:
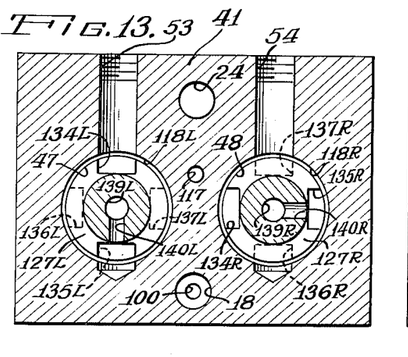

Next assume a reverse drive operation for the vehicle whereupon control handles 60 and 61 are rotated clockwise (as viewed in FIGURES 1 and 9) while the spools 49 and 50 are rotated counterclockwise approximately 45° from neutral or 90° from their forward drive positions. In the reverse drive operation fluid inlet pressure at port 51 again operates to open braking valve 22, as previously discussed, while the flow of fluid is as otherwise pictorially represented in FIGURE 10g. Accordingly, fluid under pressure at inlet port 51 flows through passage 81 and groove 126L into passage 18LL and its extension 18 and thence into transverse passage 114 (FIGURE 10g(D)) whose branches 114LU, 114LL and 114RL, 114RU now register and communicate with the respective slots 134L, 135L and 134R, 135R. The latter slots open into grooves 127L and 127R which communicate with work ports 53 and 54 and, in turn, by way of conduits 30 and 31 with hydraulic motors 34 and 35. Under this condition the discharge or outlet side of the associated motors communicate by conduits 32 and 33, with work ports 55 and 56 which now communicate by way of grooves 128L and 128R and slots 136L, 137L and 136R, 137R with the respective diagonal branches 112LL, 112LU and 112RL, 112RU, of transverse passage 112 (FIGURE 10g(E)), which latter passage, in turn, opens into interconnecting passage 24 and thence through braking valve 22 to outlet port 52 for return to reservoir 12.

Assume now that the one spool 49 is retained in neutral while the other spool 50 is rotated clockwise to a forward drive position, as depicted by the broken lines position of the control handle in FIGURE 9, with the fluid flow as pictorially represented in FIGURE 10a. In this instance fluid from inlet port 51 flows through passage 81 and groove 126L into diagonal branch 18LL and its longitudinal extension passage 18 into transverse passage 114 and by way of the diagonal branches 114RL and 114RU and the respective slots 136R and 137R (FIGURE 10a(D)) into groove 128R, thence through work port 56 and conduit 33 to motor 35 to drive said motor forwardly. The outlet from said motor communicates by way of conduit 31 with work port 54 which, in turn, opens into groove 127R and slots 134R and 135R while the latter slots are connected by way of diagonal branches 112RU and 112RL with the transverse passage 112 (FIGURE 10a(E)) and the interconnecting longitudinal passage 24. Since the braking valve 22 is retained open by virtue of fluid pressure in inlet passage 21, passage 24 is free to discharge through the latter valve to outlet port 52 and reservoir 12. Since valve spool 49 remains in neutral the associated hydraulic motor 34 remains inoperative during this sequence of operations.

Although only four of the nine available combinations of flow control positions of the proposed valve assembly have been operatively described herein, the other operating positions thereof together with the relative dispositions of the various valving components during such operating positions will be readily understood from a perusal of the various figures of the drawings herein. By thus limiting the description to the particular operations covered, we avoided unduly lengthening and complicating the present specification without omitting any of the essential details necessary to a clear understanding of the invention.

The axially extending valve-like plungers 141R, 146R and 141L, 146L (FIGURE 2) in addition to aiding in providing a load sensing "feel," as previously mentioned, also provide a means for unloading or bypass relief from a buildup of excess pressures when the associated hydraulic propulsion motors tend to function as pumps. For instance, if the vehicle operator should accidentally, or otherwise, throw the control handles 60, 61 to neutral when the vehicle is moving without being driven by the vehicle's engine, such as might be experienced when traveling downhill, the propulsion motors would immediately start to function as hydraulic pumps. A similar condition could also arise as the vehicle is brought to a sudden stop. When the hydraulic drive motors tend to function as hydraulic pumps this produces an inordinate buildup of pressure in the outlet or discharge side of said motors, and, since the fluid flow connection from the motors to the outlet port for the valve unit has been closed by virtue of putting the control valves in neutral, the continued buildup of such pressure must be prevented, an action which is accomplished by said plunger valves. Under this condition the return flow entering work ports 53 and 54 from the respective drive motors enters radial passages 140L and 140R (FIGURE 13) and reacts against the end surfaces of piston rods 142L and 142R which thereupon causes plungers 141L and 141R to move axially into engagement with the wall of bonnet 44 thereby causing the spools 49 and 50 to be moved axially, to the right as viewed in FIGURE 2, against the reaction or opposition of the preloaded spring 149L and 149R. This latter movement communicatively aligns a portion of the slots 134L, 135L and 134R, 135R with the respective proximate annular grooves or recesses 119L and 119R, thereby permitting fluid communication between the inlet or high pressure work ports 53, 54 and the respective outlet or low pressure work ports 55, 56 so as to permit free fluid circulation through the respective drive motor circuits and thus minimize a buildup of pressure therewithin. When the emergency condition ceases to exist the springs 149L and 149R will react to aid in axially repositioning the respective valve spools. When said drive motors are being operated in an opposite direction the plungers 146L and 146R in the opposite ends of the spools 49 and 50 operate in a like manner to establish communication between the then inlet or high pressure work ports 55, 56 and the outlet or low pressure work ports 53, 54 by way of the respective slots 136L, 137L and 136R, 137R and the annular recesses 118L, 118R and upon cessation of the unusual condition springs 149L and 149R react to aid in returning said spools to their normal operating positions. These pressure sensing and reactive plungers or servo-motors and their associated components thus provide an integral pressure relief for discharging fluid between the high and low pressure control or work ports of the control valve assembly when the outlet from said assembly is otherwise closed to such pressure buildup. On the other hand, if the pressure buildup occurs on the inlet side, such as might be experienced because of a heavy load on the vehicle, either these plunger valves or the relief valve 19 could operate to relieve such pressures.

Figure 18:
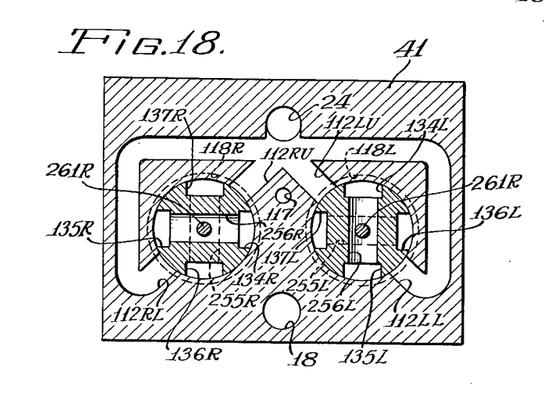
FIGURE 18 is a vertical sectional view, shown in somewhat reduced scale, taken generally along the line 18—18 of FIGURE 17.

In the modification, illustrated in FIGURES 17–18, when the pressure builds up because the motors tend to function as pumps, the return flow entering work ports 53 and 54 from the respective motors enters slots 134L, 135L and 134R, 135R and thence by way of interconnecting radial passages 255L, 255R reacts against plungers 259L, 259R. This pressure thereupon causes said plungers to move axially along bores 257L, 257R until they engage plungers 258L, 258R which are also moved axially until the end face of the latter plungers abut the end face of end cap 242. When the plungers have moved as far as possible the pressure then reacts against the surface of radial passages 255L, 255R and causes the respective valve spools to move axially to the left, as viewed in FIGURE 17, against the reaction of spring 249R. When said spools have moved sufficiently to communicatively align a portion of the slots 136L, 137L and 136R, 137R proximate the dead-end portions thereof with the respective proximate annular grooves or recesses 118L and 118R, thereby establishing fluid communication between the inlet or high pressure work ports 53, 54 and the respective outlet or low pressure work ports 55, 56, free fluid interchange is effected through the respective drive motor circuits thus minimizing the buildup of pressure therewithin. Upon cessation of the emergency the springs 249RL and 249R will react to aid in returning the respective spools to their normal operating positions. When the motors are being operated in the opposite direction the return flow entering work ports 55, 56 from the respective motors enters radial passages 245L, 245R and reacts against both plungers 258L, 258R and 259L, 259R thus causing the former plungers to slidably move into engagement with the end face of end cap 242 while the latter plungers acting through their reduced-section end portions 261L, 261R engage the side walls of radial passages 255L, 255R thus causing slidable movement or displacement leftwardly of the respective spools against the opposition of springs 249L, 249R. When the pressure is sufficient to overcome the reaction or opposition of the springs the spools will be moved sufficiently to again allow fluid interchange by way of slots 136L, 137L and 136R, 137R between the inlet or high pressure work ports 55, 56 and the respective outlet or low pressure work ports 53, 54 to minimize a buildup of pressure within these circuits.

It should now be obvious that the proposed hydraulic control assembly provides an improved and hydraulically balanced control valve unit highly adaptable for a variety of four-way hydraulic control applicatons, as well as a unit that, additionally, provides an interlocking series-flowthrough of both the valve units thereof when the assembly is conditioned for neutral operation. Since substantially uniform and open port areas have been provided therein for all positions of the control handles, said control device thus insures acceptable flow velocities therethrough. An integral braking or anti-cavitation valve device incorporated in the unit for automatic functioning plus a pressure relief means therein with discharge direct to a reservoir source of fluid supply, additionally, provide highly desirable safety features therefor. Furthermore, the unit provides an integral pressure relief or unloader bypass means for discharging between the high and low pressure reversible flow control or work ports thereof so as to prevent excessive pressure buildup therein such as may be experienced under heavy load or when associated hydraulic motor devices being controlled thereby accidentally function as hydraulic pump means.

Although only a preferred form of the invention has been illustrated, and that form described in detail, it will be apparent to those skilled in the art that various modifications may be made therein without departing from the spirit of the invention or from the scope of the appended claims.

What is claimed is:

1. A multiple distributing valve unit for individually controlling a plurality of fluid pressure motors, comprising: a housing having a plurality of bores therein, inlet and exhaust ports adapted for connection, respectively, with different portions of a hydraulic circuit and being communicatively connected one each with a proximate one of said bores, and a plurality of sets of work ports each set of which opens into a respective bore and is adapted for connection to a fluid pressure motor; a spool valve element slidably and rotatably disposed in each said bore; separate resilient means opposing longitudinal movement of each said spool valve elements; separate means formed in said spool valve elements and in said housing defining passageways for transmission of fluid therethrough; said spool valve elements being selectively and independently operable for controlling the passage of fluid through said passageways and to effect fluid communication between predetermined ports of said housing; each of said spool valve elements being fashioned so that in one position thereof fluid under pressure is transmitted through an associated fluid pressure motor in one direction, and in another position fluid under pressure is transmitted through the associated fluid motor in another direction, and in a neutral position fluid under pressure is directed from said inlet port to said exhaust port; each of said spool valve elements additionally fashioned to provide longitudinal bores extending through the central portion thereof one from each end of the spool; a piston slidably disposed in each of said longitudinal bore; means for limiting outward movement of said pistons; means formed in said spool element communicatively connecting said longitudinal bores with the interior of respective housing bores; said pistons being operative when said spool valve elements are in neutral position for slidably moving said spool valve elements longitudinally in the respective housing bores to effect free fluid communication between the work ports of a set of said work ports in response to a pressure differential therebetween sufficient to slide a respective spool element against the reaction of a respective resilent means.

2. A multiple distributing valve unit for individually controlling a plurality of fluid pressure motors, comprising: a housing having a plurality of bores therein, inlet and exhaust ports adapted for connection, respectively, with different portions of a hydraulic circuit and being communicatively connected one each with a proximate one of said bores, and a plurality of sets of work ports each set of which opens into a respective bore and is adapted for connection to a fluid pressure motor; a spool valve element slidably and rotatably disposed in each said bore; separate resilient means opposing longitudinal movement of each said spool valve elements; separate means formed in said spool valve elements and in said housing defining passageways for transmission of fluid therethrough; said spool valve elements being selectively and independently operable for controlling the passage of fluid through said passageways and to effect fluid communication between predetermined ports of said housing; each of said spool valve elements being fashioned so that in one position thereof fluid under pressure is transmitted through an associated fluid pressure motor in one direction, and in another position fluid under pressure is transmitted through the associated fluid motor in another direction, and in a neutral position fluid under pressure is directed from said inlet port to said exhaust port; each said spool valve element having servo-motor means therein operative to slide a respective spool valve element against the reaction of a respective resilient means; means cooperative with said servo-motors for limiting longitudinal movement of said spool elements; means formed in said spool elements communicatively connecting said servo-motor means with the interior of a respective housing bore; said servo-motor means being operative for slidably moving said spool valve elements in the respective housing bores whereby free fluid communication is established between the work ports of a set of said work ports in response to a pressure differential therebetween sufficient to effect slidable movement of a spool valve element against the reaction of a respective resilient means when said respective spool valve element is in a neutral position thereof.

3. A control valve for pressurized fluid comprising:

a casing having first and second bores therein, first and second spool valve elements slidably and rotatably retained in a normal operative position in the respective bores, means biasing said elements into first, second and third preselected positions as they are rotated within said bores, each said element being formed with first, second, third and fourth land portions with first, second and third annular grooves between said lands, a valve inlet in said casing opening into the first annular groove of said first element, first longitudinal slots closed at one end formed in the outer surface of each said first land and opening at an opposite end into a respective said first groove, fluid passage means formed in said casing communicatively interconnecting said first slots of said first and second elements when said elements are in their second preselected position, a valve outlet in said casing opening into said first groove of said second element, a first closed-end port formed in said casing, a fluid passageway connecting said first closed-end port with the valve inlet under all positions of the valve, a second closed-end port formed in said casing, a fluid passageway connecting said second closed-end port with the valve outlet, second longitudinal slots closed at one end formed in the outer surface of each said third land portion and opening at an opposite end into a respective said second groove, third longitudinal slots closed at one end formed in the outer surface of each said third land portion and opening at an opposite end into a respective said third groove, a passageway formed in said casing connecting said second slots with the fluid passageway connected with said first closed-end port when said spool valve elements are in their third position and connecting said third slots with the latter fluid passageway when said spool valve elements are in their first position, a passageway formed in said casing connecting said second slots with the fluid passageway connected with said second closed-end port when said spool valve elements are in their first position and connecting said third slots with the latter fluid passageway when said spool valve elements are in their third position, and valve control ports formed in said casing opening into said second and third grooves and adapted for connection with work-producing devices.

4. A control valve for pressurized fluid comprising: a casing having first and second bores therein, first and second spool valve elements slidably and rotatably disposed in a normal operative position in the respective bores, means biasing said elements into first, second and third preselected positions as they are rotative within said bores, each said element being formed to include first and second longitudinally spaced annular grooves having a land portion extending between said grooves, a valve inlet in said casing, a valve outlet in said casing, a first closed-end port formed in said casing, a fluid passageway communicatively connecting said first closed-end port with the valve inlet in all positions of said spool valve elements, a second closed-end port formed in said casing, a fluid passageway communicatively connecting said second closed-end port with the valve outlet, first axially extending slots closed at one end and opening at an opposite end into said first groove and formed in the surface of said land portion, second axially extending slots closed at one end and opening at an opposite end into said second groove and formed in the surface of said land portion, a first passageway formed in said casing connected with the fluid passageway connected with said first closed-end port and communicatively connectable with certain of said slots when said spool valve elements are in their first position and with others of said slots when said latter elements are in their third position, a second passageway formed in said casing connected with the fluid passageway connected with said second closed-end port and communicatively connectable with certain of said slots when said spool valve elements are in their first position and with others of said slots when said latter elements are in their third position, and valve control ports formed in said casing opening into each of said grooves.

5. A control valve for pressurized fluid comprising: a casing having a first and a second bore, a first and a second spool valve element slidably and rotatively retained in a normal operative position in the respective bores, means biasing said elements into a plurality of preselected positions as they are rotated, one of these positions being a neutral position, each said element having a body portion and an annular groove therein, a valve inlet in said casing opening into the annular groove of said first element, slots closed at one end formed in the surface of each said body portion and opening at an opposite end into a respective annular groove, fluid passage means formed in said casing communicatively interconnecting the slots of the respective elements when said elements are in the neutral position, a valve outlet in said casing opening into the annular groove of said second element such that when both said elements are in their neutral position fluid may freely flow from the valve inlet into the groove of said first element through the slots in said first elements and through said fluid passage means into the slots in said second element into the groove in said second element and out the valve outlet.

6. A control device for pressurized fluid of the type including a casing having a bore therein, a spool valve element slidably and rotatably retained in said bore, and having sufficient ports, slots and passageways formed in said casing and valve element such that by adjusting the rotative position of said spool valve element said ports, slots and passageways are communicatively interconnected for controlling the flow and direction of fluid therethrough, the improvement comprising: resilient means opposing longitudinal movement of said spool valve element, said spool valve element being formed with first and second annular grooves between which is located a land portion, said annular grooves and said land portion defining in cooperation with said casing a first and second fluid chamber, control ports formed in said casing opening into said first and second fluid chambers and adapted for connection to a work-producing hydraulic device, a plurality of sets of longitudinal slots formed in the peripheral surface of said land portion and having each set of slots normally opening into only one of said annular grooves, said spool valve element being slidable in one direction for communicatively interconnecting said control ports by way of one set of said longitudinal slots and in an opposite direction for communicatively interconnecting said control ports by way of another set of said longitudinal slots, said spool valve element having longitudinal bores extending through the central portion thereof one from each end and terminating adjacent the proximate annular groove, and having radial passages extending one from each said longitudinal bore to a respective annular groove, a piston slidably disposed in each said longitudinal bore, and means for limiting outward movement of said pistons such that when a differential of pressure between said control ports is sufficient to move said spool valve element longitudinally against the reaction of said resilient means fluid from the high pressure control port may flow through an associated set of longitudinal slots and into the adjacent low pressure fluid chamber.

7. A control device for pressurized fluid of the type including a casing having a plurality of bores therein, a plurality of spool valve elements slidably and rotatably retained in said bores, and having sufficient ports, slots and passageways formed in said casing and valve elements such that by adjusting the rotative positions of said spool valve elements said ports, slots and passageways are communicatively interconnected for controlling the flow and direction of fluid therethrough, the improvement comprising: resilient means opposing longitudinal movement of said spool valve elements, said elements each being formed with first and second annular grooves between which is located a land portion, said annular grooves and said land portion defining in cooperation with said casing a first and second fluid chamber for each spool valve element, control ports formed in said casing opening into said first and second chambers and adapted for connection to work-producing devices, a plurality of sets of longitudinal slots formed in the peripheral surface of each said land portion and having each set of slots normally opening into only one of said annular grooves, said spool valve elements being slidable in one direction for communicatively interconnecting certain of said control ports by way of one set of said longitudinal slots and in an opposite direction for communicatively interconnecting certain others of said control ports by way of another set of said longitudinal slots, said spool valve elements each having longitudinal bores extending through the central portion thereof one from each end and terminating adjacent the proximate annular groove and having radial passages extending from each said longitudinal bore to a respective annular groove, a piston slidably disposed in each said longitudinal bore, and means for limiting outward movement of said pistons such that when a differential of pressure between a set of said control ports is sufficient to move a spool valve element longitudinally against the reaction of an associated resilient means fluid from the high pressure control port may flow through an associated set of longitudinal slots and into the adjacent low pressure fluid chamber.

8. A multiple distributing valve unit for individually controlling a plurality of fluid pressure motors, comprising: a housing having a plurality of bores therein, inlet and exhaust ports adapted for connection, respectively, with different portions of a hydraulic circuit and being communicatively connected one each with a proximate one of said bores, a plurality of sets of work ports each set of which opens into a respective bore and is adapted for connection to a hydraulic work producing device, and a relief port adapted to be connected to a reservoir source of fluid supply; a spool valve element rotatably disposed in each said bore; separate means formed in said spool valve elements and in said housing defining passageways for transmission of fluid therethrough including a fluid passage communicatively connecting said relief port with the bore that is connected with said inlet port; said spool valve elements being selectively and independently operable for controlling the passage of fluid through said passageways and to effect fluid communication between predetermined ports of said housing, each spool valve element being selectively rotatable to one of three operating positions, namely a neutral position in which the work ports are isolated from both the inlet and exhaust ports and concomitant therewith said inlet and exhaust ports are communicatively interconnected, a second position in which one work port of a set of work ports is communicatively connected with said exhaust port and the other work port of said set with said inlet port, and a third position in which the connections established in the second position are reversed; and relief valve means disposed in said relief port and having a inlet of said latter valve means communicatively connected at all times with said inlet port and an outlet thereof adapted for connection to a reservoir source of fluid supply, said relief valve being operative responsive to an increase in fluid pressure in said multiple valve unit above a predetermined value to effect a venting of said valve unit to a reservoir source of fluid supply.

9. A control valve for pressurized fluid comprising: a casing having first and second bores therein, first and second spool valve elements rotatably retained in a normal operative position in the respective bores, means biasing said elements into first, second and third preselected positions as they are rotated within said bores, each said element being formed with first, second, third and fourth land portions with first, second and third annular grooves between said land portions, a valve inlet formed in said casing opening into the first annular groove of said first element, first longitudinal slots closed at one end formed in the outer surface of each said first land portion and opening at an opposite end into a respective said first groove, first fluid passage means formed in said casing communicatively interconnecting said first slots of said first and second elements when said elements are in their second preselected position, a valve outlet formed in said casing, said casing having a closed-end bore therein connecting at the open end thereof with said valve inlet, second fluid passage means communicatively connecting said latter bore with said valve outlet and with said first annular groove of said second element so that when said spool valve elements are in their second preselected position fluid communication is established from said valve inlet by way of said first longitudinal slots in said spool valve elements through said closed-end bore to said valve outlet, a first fluid passageway formed in said casing communicatively connected with said valve inlet in all preselected positions of said valve elements, a second fluid passageway formed in said casing communicatively connected with said closed-end bore, second longitudinal slots closed at one end formed in the outer surface of each said third land portion and opening at an opposite end into a respective said second groove, third longitudinal slots closed at one end formed in the outer surface of each said third land portion and opening at an opposite end into a respective said third groove, a first transverse passageway formed in said casing and connecting said second slots and said third slots selectively with said second fluid passageway when said spool valve elements are in their first and third positions respectively, a second transverse passageway formed in said casing and connecting said second slots and said third slots selectively with said first fluid passageway when said spool valve elements are in their third and first positions respectively, valve control ports formed in said casing opening into said second and thrd grooves and adapted for connection with work-producing devices, valving means disposed in said closed-end bore and operative between an open position communicatively interconnecting said second fluid passageway with said valve outlet and a closed position interrupting fluid communication between said second fluid passageway and said valve outlet, means normally biasing said valving means to a closed position when both said valve spool elements are in their second preselected position, but having said valving means operative to an open position responsive to fluid pressure in said valve inlet when at least one of said valve spool elements is in the first or third preselected position thereof.

10. The invention according to claim 9 further characterized in that said valving means includes a spool-like valve element slidable within said closed-end bore and fashioned with three longitudinally spaced body portions providing two fluid chambers between said body portions and disposed so that one of said chambers in cooperation with a portion of said closed-end bore provides a fluid passage communicatively connecting the first annular groove of said second spool valve element with said valve outlet regardless of the preselected position of said first and second spool valve elements, and further in that the other one of said chambers of said spool-like valve element together with its associated body portions and another portion of said closed-end bore provides a fluid passage communicatively connecting the said second fluid passageway with said valve outlet when at least one of the said first and second spool valve elements is positioned in a first or a third preselected position thereof.

11. A control device for pressurized fluid of the type including a casing having a bore therein, a spool valve element slidably and rotatably retained in said bore, and having sufficient ports, slots and passageways formed in said casing and valve element such that by adjusting the rotative position of said spool valve element said ports, slots and passageways are communicatively interconnected for controlling the flow and direction of fluid therethrough, the improvement comprising: resilient means disposed for opposing longitudinal movement of said spool valve element, said spool valve element being formed with first and second annular grooves between which is located a land portion, said annular grooves and said land portion defining in cooperation with said casing first and second fluid chambers, control ports formed in said casing opening one each into said first and second fluid chambers and adapted for connection to a fluid pressure motor, a plurality of sets of longitudinal slots formed in the peripheral surface of said land portion and having each set of slots normally opening into only one of said annular grooves, said spool valve element being slidable for communicatively interconnecting said control ports by way of one of said sets of said longitudinal slots, pressure sensing and reactive means disposed in said spool valve element and communicatively connected at all times with at least one of said control ports, said pressure sensing and reactive means being operative for slidably moving said spool valve element longitudinally in response to a pressure differential between said control ports sufficient to slide said spool element against the reaction of said resilient means.

12. A control device for pressurized fluid of the type including a casing having a bore therein, a spool valve element slidably and rotatably retained in said bore, and having sufficient ports, slots and passageways formed in said casing and valve element such that by adjusting the rotative position of said spool valve element said ports, slots and passageways are communicatively interconnected for controlling the flow and direction of fluid therethrough, the improvement comprising: resilient means disposed for opposing longitudinal movement of said spool valve element, said spool valve element being formed with first and second annular grooves between which is located a land portion, said annular grooves and said land portion defining in cooperation with said casing first and second fluid chambers, control ports formed in said casing opening one each into said first and second fluid chambers and adapted for connection to a fluid pressure motor, a plurality of sets of longitudinal slots formed in the peripheral surface of said land portion and having each set of slots normally opening into only one of said annular grooves, said spool valve element being slidable in one direction only for communicatively interconnecting said control ports by way of one set of said longitudinal slots, pressure sensing and reactive means disposed in said spool valve element, means defining fluid passages communicatively connecting said pressure sensing and reactive means at all times with each of said control ports, said pressure sensing and reactive means being operative for slidably moving said spool valve element longitudinally in one direction in response to a pressure differential between said control ports sufficient to slide said spool element against the reaction of said resilient means.

13. A multiple distributing valve unit for individually controlling a plurality of fluid pressure motors, comprising: a housing having a plurality of bores therein, inlet and exhaust ports adapted for connection, respectively, with different portions of a hydraulic circuit and being communicatively connected one each with a proximate one of said bores, and a plurality of sets of work ports each set of which opens into a respective one of said bores and is adapted for connection to a fluid pressure motor; a spool valve element slidably and rotatably disposed in each said bore; separate resilient means opposing longitudinal movement of each said spool valve elements; separate means formed in said spool valve elements and in said housing defining passageways for transmission of fluid therethrough; said spool valve elements being selectively and independently operable for controlling the direction and passage of fluid through said passageways and to effect fluid communication between predetermined ports of said housing; each of said spool valve elements being fashioned so that in one position thereof fluid under pressure is transmitted through an associated fluid pressure motor in one direction, and in another position fluid under pressure is transmitted through the associated fluid motor in another direction, and in a neutral position fluid under pressure is directed from said inlet port to said exhaust port; each said spool valve element having pressure sensing and reactive means disposed therein and including means formed in the respective spool communicatively connecting said former means at all times with at least one of the work ports of a set of said ports; said pressure sensing and reactive means being operative to slide a respective spool valve element against the opposition of a respective resilient means; said pressure sensing and reactive means being operative responsive to an increase in pressure above a predetermined value in either one of the work ports of a set of said work ports for axially sliding the respective spool element whereby fluid communication is established between the work ports of a said set of work ports when said spool valve element is in a neutral position thereof.

14. A control device for pressurized fluid of the type including a casing having a bore therein, a spool valve element slidably and rotatably retained in said bore, and having sufficient ports, slots and passageways formed in said casing and valve element such that by adjusting the rotative position of said spool valve element said ports, slots and passageways are communicatively interconnected for controlling the flow and direction of fluid therethrough, the improvement comprising: resilient means opposing longitudinal movement of said spool but having said means arranged to permit limited longitudinal movement before opposing further such movement thereof, axially spaced separate abutment means engageable selectively with opposite ends of said resilient means upon movement of said spool beyond said limited longitudinal movement thereof, said spool valve element being formed with first and second annular grooves between which is located a land portion, said annular grooves and said land portion defining in cooperation with said casing first and second fluid chambers, control ports formed in said casing opening one each into said first and second fluid chambers and adapted for connection to a fluid pressure motor, a plurality of sets of longitudinal slots formed in the peripheral surface of said land portion and having each set of slots normally opening into only one of said annular grooves, pressure sensing and reactive means disposed in said spool valve element and communicatively connected at all times with at least one of said control ports, said pressure sensing and reactive means being operative for slidably moving said spool valve element longitudinally for communicatively interconnecting said control ports by way of one of said sets of said longitudinal slots responsive to a pressure differential between said control ports sufficient to slide said spool element against the reaction of said resilient means, said resilient means being engageable with a proximate one of said abutment means upon movement of said spool element in one direction and with another one of said abutment means upon movement of said spool element in another direction whereby the friction produced between engaging surfaces is effective for creating a load sensing feel resistance to rotation of said spool element proportional to the amount of axial displacement.

References Cited by the Examiner

UNITED STATES PATENTS

| | | | |
|---|---|---|---|
| 2,220,479 | 11/40 | De Bell | 137—596.12 X |
| 2,836,195 | 5/58 | Ziskal | 137—596.12 |
| 2,893,357 | 7/59 | Clarke | 137—596.12 |

M. CARY NELSON, *Primary Examiner.*

HENRY T. KLINKSIEK, *Examiner.*